April 11, 1944.    P. W. REITTINGER    2,346,276
COAT HANGER
Filed April 12, 1943
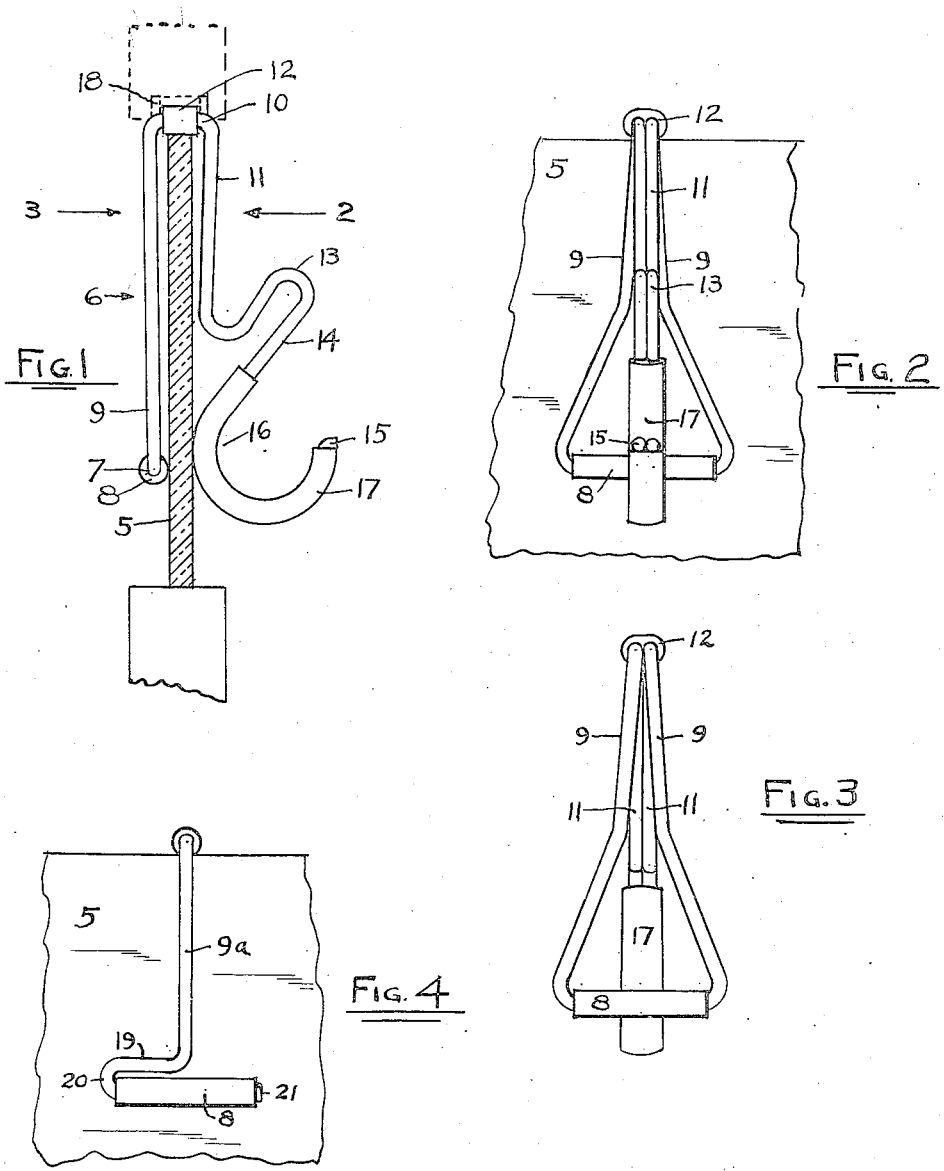
INVENTOR.
PAUL W. REITTINGER
BY
Martin E. Anderson
attorney Patented Apr. 11, 1944

2,346,276

UNITED STATES PATENT OFFICE 2,346,276

COAT HANGER

Paul W. Reittinger, Phoenix, Ariz.

Application April 12, 1943, Serial No. 482,797

2 Claims. (Cl. 248—215)

This invention relates to improvements in coat hangers or hooks.

In driving pleasure automobiles, especially in the summer, it is often desirable for the occupants to remove some outer garment, for example, an overcoat, or a coat and unless the automobile is provided with suitable hangers, such garments must be laid down onto the seat, or hung over the robe rail, in either of which cases it is likely to become wrinkled and perhaps soiled.

It is the object of this invention to produce a simple hanger or hook that can be attached to a windowpane and supported from the upper edge thereof, and which shall be of such construction that it can be readily applied and removed.

Another object is to produce a hook or hanger, of the kind specified, of such design and construction that it can be manufactured at a low cost so that it may be made available to the public at a reasonable price.

Another object is to provide a hook or hanger of such construction that the window can be closed with the hook in place thereon.

This invention, briefly described, consists of a resilient metal wire or rod reversely bent intermediate its ends to form a narrow elongated U-shaped portion in which the sides are spaced apart sufficiently to receive the plate glass windowpane of an automobile door or window. One of the sides of the U is formed into a transversely extending member lying in a plane perpendicular to the plane of the U and adapted to engage one side of a windowpane to keep the hook from rocking. The other side is formed into one or more hooks lying in the plane of the U and the two sides are biased so as to engage opposite sides of the windowpane on which they are supported. The portions coming in contact with the glass are covered with a rubber tubing or some other similar material that will prevent them from scratching the surface of the glass.

Having thus briefly enumerated the objects of the invention and described the same in a general way, the invention will now be described in detail, and for this purpose reference will be had to the accompanying drawing in which the invention has been illustrated, and in which:

Figure 1 is a section taken on line 1—1, Figure 2, and shows a hook constructed in accordance with this invention, in position on and supported by a windowpane;

Figure 2 is a front elevation looking in the direction of arrow 2, Figure 1;

Figure 3 is a rear elevation looking in the direction of arrow 3, Figure 1; and

Figure 4 is a view similar to that shown in Figure 3, but showing a slightly modified form of construction.

In the drawing reference numeral 5 represents a plate glass windowpane such as is found in automobile doors and windows. The window has been shown in partly closed position. The hook or hanger consists of a resilient metal wire that is reversely bent so as to form a structure having a straight portion 7 that is covered by a rubber tube 8. From the ends of the straight portion, the wire extends upwardly and inwardly forming inclined sides 9. After the inclined sides come in contact, they are kept in parallel relation and are bent at right angles to the plane of the triangle formed by sides 7 and 9, forming a short straight portion 10 that terminates in a downwardly extending portion 11. The part 10 is preferably covered with a short section of rubber tubing 12. The downwardly extending side 11 is formed into a hook 13, the upwardly projecting part of which is reversely bent and extends downwardly and inwardly as indicated by reference numeral 14 terminating in an upwardly extending portion 15 that forms a lower and larger hook which has been designated by reference numeral 16. The lower hook is covered with a rubber tubing 17. The two parts 9 and 11, when viewed as in Figure 1, form an elongated inverted U and are spaced sufficiently far apart to permit the hook to be slipped over the upper edge of a plate glass windowpane. The transversely extending portions 7, with its rubber covering 8, engage one surface of the windowpane and resists any tendency for the hook to rock sidewise. The two sides are biased towards each other so as to engage the opposite surfaces of the pane with a resilient pressure. The rubber tubing 17, that surrounds the hook portion 16, presses against the under surface of the windowpane at a point practically opposite from that portion engaged by the transversely extending rubber tube 8. The short straight portion 10 and the rubber tube 12 are of such length that they can be forced into the recess 18 in the upper wall of the window opening so that the window may be closed tightly in case of storm.

In Figure 4 a slightly modified form has been shown in which a single wire is employed. The downwardly extending portion has been designated by reference numeral 9a and this terminates in a laterally extending portion 19 that is reversely bent at 20 and terminates at point 21.

A rubber tube 8 covers the transversely extending portion.

It will be observed that the straight part between points 20 and 21 extends substantially equal distances to opposite sides of the part 9a and therefore serves to prevent rocking motion in the same manner as with the construction shown in Figures 1, 2 and 3.

Although in the drawing the material employed has been shown as round, it is evident that the wire or bar from which the hook is made can be rectangular and may be of greater width than thickness, especially if it is constructed in the manner indicated in Figure 4.

It is evident from the drawing and from the above description that a hook or hanger formed in the manner shown and described can readily be applied to a windowpane and as readily removed therefrom. The construction is such that the windowpane is engaged on both sides by a yielding pressure which prevents the hook from rattling and holds it against accidental movement.

The protector tubes 8 and 12, although they are desirable, may be omitted and are not depended on to give patentability to the invention as such resilient coverings are known to be employed for several purposes and are shown in U. S. Letters Patent 2,083,077, issued on June 8, 1937.

Having described the invention what is claimed as new is:

1. A coat hanger adapted to be supported from the upper edge of a windowpane, comprising, a resilient metal member bent into the shape of a narrow inverted U, the lower end of one of the sides having a portion lying in a plane perpendicular to the plane of the U portion and extending a substantial distance beyond both sides of the plane of the U for engaging one surface of a pane to resist rocking movement, the other end terminating in a hook lying in the plane of the U, the distance between the two sides adjacent the base of the U being greater than the thickness of the windowpane, the sides being inclined towards each other in a downward direction, the distance between the adjacent surfaces of the hook and the rock resisting element being less than the thickness of the windowpane, whereby the hanger exerts a compressive action on the window pane at its lower end.

2. A coat hanger adapted to be supported from the upper edge of a windowpane, comprising, a resilient metal wire bent intermediate its ends to provide parallel portions, the middle portion being substantially straight and perpendicular to the parallel portions, those portions adjacent the ends of the straight portions being upwardly and inwardly inclined to the point where the sides become substantially parallel, whereby a triangular space is outlined, the parallel sides being reversely bent about an axis parallel with the straight portions, forming a narrow elongated U the other end terminating in a hook lying in the plane of the U, the sides adjacent the reverse bend being spaced apart a distance greater than the thickness of the windowpane, the sides being inclined towards each other into resilient engagement with opposite sides of the supporting pane.

PAUL W. REITTINGER.